US008238556B2

(12) United States Patent
Yuan et al.

(10) Patent No.: US 8,238,556 B2
(45) Date of Patent: Aug. 7, 2012

(54) QUANTUM COMMUNICATION SYSTEM

(75) Inventors: Zhiliang Yuan, Cambridge (GB); Andrew James Shields, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 1102 days.

(21) Appl. No.: 11/530,329

(22) Filed: Sep. 8, 2006

(65) Prior Publication Data
US 2007/0064945 A1   Mar. 22, 2007

(30) Foreign Application Priority Data

Sep. 9, 2005   (GB) .................................. 0518470.0

(51) Int. Cl.
*H04L 29/08* (2006.01)
(52) U.S. Cl. .............. 380/263; 398/47; 398/75; 398/98; 398/140; 398/151; 356/491
(58) Field of Classification Search .................. 380/263, 380/283, 256; 356/491; 398/47, 75, 98, 398/140, 151
See application file for complete search history.

(56) References Cited

U.S. PATENT DOCUMENTS

| | | | | |
|---|---|---|---|---|
| 5,307,410 A | * | 4/1994 | Bennett | 380/256 |
| 5,675,648 A | * | 10/1997 | Townsend | 380/283 |
| 5,953,421 A | * | 9/1999 | Townsend | 380/283 |
| 6,272,224 B1 | * | 8/2001 | Mazourenko et al. | 380/283 |
| 2007/0182968 A1 | * | 8/2007 | Nishioka et al. | 356/491 |

FOREIGN PATENT DOCUMENTS

| | | |
|---|---|---|
| GB | 2 368 502 A | 5/2002 |
| GB | 2 404 103 A | 1/2005 |

OTHER PUBLICATIONS

Won-Young Hwang, "Quantum Key Distribution with High Loss: Toward Global Secure Communication", Physical Review Letters, vol. 91, No. 5, Aug. 1, 2003, pp. 057901-1 to 057901-4.

Brig B. Elliott, et al., "Path-length control in a interferometric QKD link", SPIE, vol. 5105, 2003, pp. 26-38.

* cited by examiner

*Primary Examiner* — Vivek Srivastava
*Assistant Examiner* — Thong Truong
(74) *Attorney, Agent, or Firm* — Oblon, Spivak, McClelland, Maier & Neustadt, L.L.P.

(57) ABSTRACT

A quantum communication system comprising a sending unit and a receiving unit, said sending unit comprising a photon source assembly configured to output a stream of pulses of light having at least two different intensities and a memory configured to store information for determining which pulses should be reference pulses and which pulses should be data pulses, the average intensity of reference pulses being different to the average intensity of data pulses, the receiving unit comprising a memory for storing information for identifying the position of reference pulses within the stream of pulses and a processor for determining the calibration of the quantum communication system from the reference pulses.

19 Claims, 7 Drawing Sheets

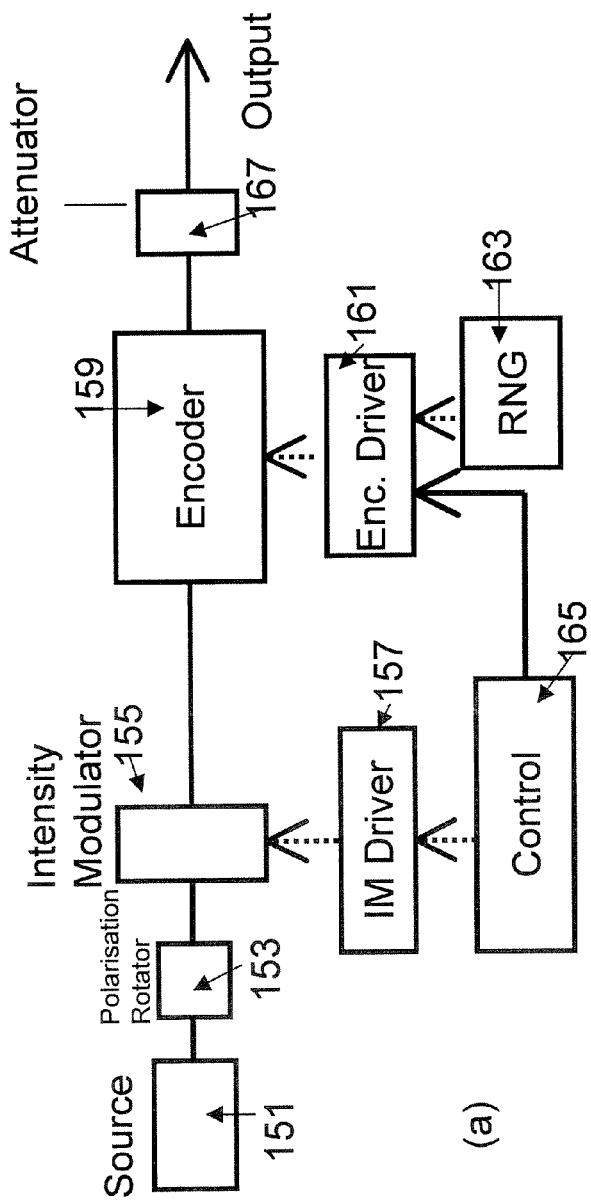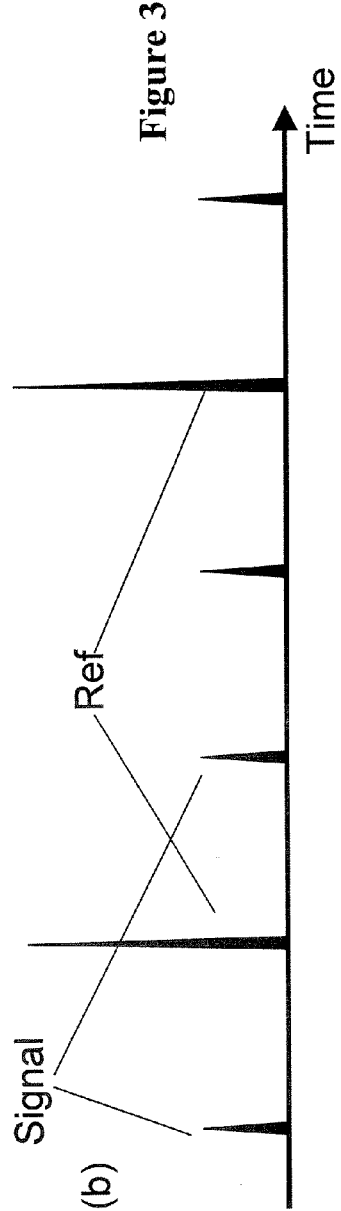
Figure 3

QUANTUM COMMUNICATION SYSTEM

The present invention is concerned with the field of quantum communication systems and emitters which may be used in such systems. Specifically, the present invention is concerned with the use of a reference pulse in a quantum communication system in order to provide active stabilisation or calibration of the system and how that reference pulse is sent with data pulses.

In quantum communication systems, information is transmitted between a sender and a receiver by encoded single quanta, such as single photons. Each photon carries one bit of information encoded upon a property of the photon, such as its polarisation, phase or energy/time. The photon may even carry more than one bit of information, for example, by using properties such as angular momentum.

Quantum key distribution is a technique for forming a shared cryptographic key between two parties; a sender, often referred to as "Alice", and a receiver often referred to as "Bob". The attraction of this technique is that it provides a test of whether any part of the key can be known to an unauthorised eavesdropper (Eve). In many forms of quantum key distribution, Alice and Bob use two or more non-orthogonal bases in which to encode the bit values. The laws of quantum mechanics dictate that measurement of the photons by Eve without prior knowledge of the encoding basis of each causes an unavoidable change to the state of some of the photons. These changes to the states of the photons will cause errors in the bit values sent between Alice and Bob. By comparing a part of their common bit string, Alice and Bob can thus determine if Eve has gained information.

Examples of quantum communication systems are described in GB 2 368 502 which is an earlier application from the applicant.

When the photons are encoded using phase, typically, a Mach-Zender interferometer is provided in both Alice's sending equipments and Bob's receiving equipment. Each interferometer has a long path and a short path. Details of how the photons are encoded using this arrangement will be described later. However, it is required that photons that contribute to the key or the encoded information through the short arm of one interferometer and the long arm of the other interferometer. Thus, the photons may follow one of two paths: Path 1, the short arm of Alice's interferometer and the long arm of Bob's interferometer; and Path 2, the long arm of Alice's interferometer and the short arm of Bob's interferometer.

Both interferometers will contain a phase modulator which can be used to either vary the phase of photons passing through the interferometer either randomly or under the control of either Alice or Bob.

However, it is necessary that any other phase delay between Path 1 and Path 2 is constant throughout transmission as any other phase delay can increase the quantum bit error rate and can even make the system unusable if it exceeds a certain level. Thus, in practice, one has to calibrate the phase delay every several tens of seconds or several minutes depending on the stability of the system. This introduces a dead time to the system. Also, during key distribution, no information concerning the phase drift can be obtained. This causes extra difficulties in identifying the presence of an eavesdropper as Alice and Bob cannot identify the source of the quantum bit error rate. It can arise from either an eavesdropper or a variation in the phase drift.

It is also required that the polarisation of photons be stabilised. However, this presents difficulties as photons will generally be sent from Alice to Bob along a single mode fibre link and the polarisation of photons passing through this link will vary due to birefringence regions commonly existing in the single mode fibre. For example, variations in the temperature can cause the polarisation to vary randomly. It is necessary to be able to correct any rotation of the polarisation which has occurred in the fibre link because some of the components of Bob's equipment are polarisation sensitive and variations in the polarisation will again result in a higher error rate. Also, the bit rate of the system may decrease in equipment where polarisation beam splitters are used to ensure that photons pass through the short arm of one interferometer and the long arm of the other.

The applicant's previous patent application GB 2 404 103 addresses this problem by sending a separate reference pulse which has not been modulated along with every data photon pulse which carries information about the cryptographic key. The reference pulse has a stronger intensity than the data pulses.

B. B. Elliot et al "Path length control in a interferometric QKD link" (SPIE 5055, 26-28, 2003. DOI: 11.1117/12.487541) discusses the use of "training frames" or a subset of bits within "data frames" for transmitting control signals in a quantum communication system. The pulses used to transmit control signals have the same intensity as the pulses used to transmit data signals.

Pulses of different intensities have been used in quantum cryptography as so-called "decoy states" which are analysed to spot the presence of an eavesdropper. Decoy states are explained in Hwang et al. Phys. Rev. Lett. 91, 057901 (2003).

In a first aspect, the present invention provides a quantum communication system comprising a sending unit and a receiving unit, said sending unit comprising a photon source assembly configured to output a stream of pulses of light having at least two different intensities and a memory configured to store information for determining which pulses should be reference pulses and which pulses should be data pulses, the average intensity of reference pulses being different to the average intensity of data pulses, the receiving unit comprising a memory for storing information for identifying the position of reference pulses within the stream of pulses and a processor for determining drift in the system from the reference pulses.

Thus, it is possible to set the intensity for each pulse outputted by the sending unit. Being able to control or modulate the intensity of the pulses on a pulse by pulse basis has many advantages. A major advantage is that reference pulses can be sent with and intermixed with data pulses because the sender can decide for each pulse whether it is a reference pulse or a data pulse.

Thus, the invention essentially allows a code division technique to be used for sending reference signals to a receiver to allow active stabilisation of a quantum communication system, thus providing a system which can be corrected for phase drift and/or polarisation drift in real time. The reference pulses are multiplexed in time with the pulses which are intended to carry data to the receiver.

In a quantum communication system, information is encoded onto "data" pulses which are pulses which have a high probability of containing one photon or less. Often, the number of photons per pulse, averaged over many pulses is of order unity or less.

The "reference" pulses which are used to calibrate the equipment or pulses preferably have an average intensity of more than one photon per pulse to ensure that there is an increased probability of detection at the receiver for the reference pulses. Thus, the present invention is preferably configured such that the average intensity of reference pulses is higher than the average intensity of data pulses. Typically, the reference pulses will be 10 to 10,000 times stronger than the data pulses on average.

The photon source assembly may comprise a laser diode and an intensity modulator. The intensity modulator may be provided to modulate the intensity of pulses before or after an encoding means which may be provided.

Alternatively, the photon source assembly may comprise a laser diode driven by current pulses of different strengths.

The photon source assembly may be provided by a quantum light source which configured to emit pulses with a predetermined average photon number. Alternatively, the photon source assembly may comprise a classical light source, a quantum light source and means for multiplexing pulses from the quantum and classical light source. The means for multiplexing pulses preferably combines the output from the quantum source and the classical source with minimal loss for data from the quantum source.

It is convenient, if the pulses (ie both the data and reference pulses) are output in a periodic sequence, in different cycles of a clock timing sequence, with a subset of these pulses corresponding to reference pulses and the remainder data pulses. The clock cycles in which reference pulses will be output (the clock cycle number) should be known to the sender and receiver in advance. The sender and receiver may agree that the reference and data pulses will be sent in a fixed pattern which is repeated indefinitely. For example, they may agree that this fixed pattern consists of one reference pulse, followed by ten data pulses. These details may be stored in the memory of the receiving unit or sending unit.

More preferably the reference pulses are located at random positions within the pulse sequence, or at positions which are difficult for a third party to guess. In general, the reference pulses can be placed at any locations within the pulse sequence, provided these locations are known to the sender and receiver. Sender and intended recipient can pre-agree which pulses are reference pulses by pre-agreeing to use a pseudo-random number generating algorithm, in conjunction with a shared seed number. This information can be stored in the memory of the receiving unit and sending unit. The advantage of this implementation is that an eavesdropper will be unable to predict with certainty which pulses are data pulses and which are reference pulses. Thus it is more difficult for the eavesdropper to calibrate their equipment, which means the Eavesdropper will extract less information and will cause more errors in the information shared by the sender and receiver.

In general, however, the pulses need not be output periodically. It is only necessary for the sender and receiver to know the output times of the reference pulses in advance, so that they may be distinguished from the data pulses.

In general, the reference and data pulses may be output at different times within the clock cycle, although preferably they are generated at the same time in the clock cycle so as to be indistinguishable to an eavesdropper.

If the reference pulses are sent so that they substitute some of the data pulses, there is no need for the reference pulses to have a dedicated reference pulse detector. Also, there is no need for pulse splitting or time delaying means in the emitter to segregate the data pulses and reference pulses instead, there are just needed some means for varying the intensity of the generated pulses.

For the applicant's previous invention, GB2404103, one reference pulse was generated for each data pulse. However, in the current invention there is no need for the number of data pulses per unit time and the number of reference pulses per unit time to be equal. Preferably, the sending unit modulator is configured such that the number of data pulses per unit time differs from the number of reference pulses per unit time so as to increase the bit rate of the system. More preferably, the output times of the data and reference pulses are determined by information shared by the sender and receiver. The output times of the reference pulses may be determined by a random number shared or generated by the sender and receiver.

The sending unit may further comprise an encoder configured to encode quantum information onto said pulses and wherein both said data pulses and said reference pulses pass through said encoder.

The encoder may be configured to modulate or encode the reference pulses. The reference pulses may be modulated with predetermined quantum information and possibly the same quantum information. Alternatively, the reference pulses may be unmodulated.

The sending unit is preferably configured to produce reference pulses which have at least two intensity levels and the intensities of the reference pulses are varied in a predetermined sequence.

As well as allowing calibration and stabilisation of the interferometer, the reference pulses may also be used to guarantee against photon number splitting attacks by a malicious Eavesdropper. The photon number splitting attack is one of the most efficient attacks on weak pulse quantum key distribution systems. This vulnerability exists because an attenuated laser will inevitably produce some pulses containing more than one photon. Multi-photon pulses emitted by Alice can allow Eve to gain information about Alice-Bob's shared key without introducing any errors to the key and thereby remaining allowing her to remain hidden.

In the photon number splitting attack, Eve removes and stores one or more photons from each multiphoton pulse and passes the remainder of the pulse to Bob. She can then measure the stored photon after Alice-Bob reveal their encoding bases, and thereby gain full information from that pulse without causing an error in Alice-Bob's shared key. This type of attack is particularly dangerous for systems which use an attenuated laser as the signal source. To achieve secure communication, the contribution of the multiphoton pulses to Alice-Bob's shared key may be removed through privacy amplification.

By monitoring the detection rate of the data and reference pulses, which have different average intensities, Alice and Bob may estimate an upper bound on the fraction of Bob's data measurements that are caused by multi-photon pulses emitted by Alice. Using this upper bound Alice and Bob may form a secure key using privacy amplification.

Preferably Alice and Bob estimate the fraction of Bob's measurements resulting from multi-photon pulses using two sets of pulses whose average intensities are of the same order. This may be achieved by using two distinct average intensities of data pulse, or by using two distinct average intensities of reference pulses. In the latter case, the strong reference pulses are used primarily to calibrate and stabilise the interferometer, while the weak reference pulses are used to estimate the upper bound of the fraction of photon detection caused by multi-photon pulses emitted by Alice among all data photon detections made by Bob.

By outputting the reference pulses and data pulses through the same encoding means it is possible to monitor any variations in the calibration of the system during transmission of a key. By calibration we mean the signals that must be applied to the encoding and decoding means to faithfully transmit bit=0 or bit=1 from sender to receiver. Thus, the sender and receiver can determine if an increase in the bit error rate is due to an eavesdropper or due to a drift in the system calibration.

In the later examples, drift in the calibration of the system occurs due to slow changes in the fibre lengths in the senders and receivers equipment and changes in the polarisation transformation caused by the fibre.

The sending unit may also be configured to produce data pulses which have at least two intensity levels and the intensities of the data pulses are varied in a predetermined sequence. Using data pulses of two different intensities provides a further method of determining an upper bound on the fraction of Bob's measurements which are emitted by Alice. The average intensity of a subset of data pulses should be close to zero.

As previously mentioned detection of strong reference pulses are used as a feedback signal to adjust a parameter in the system. Further, preferably, the receiver comprises feedback means for altering a component of the receiver on the basis of the measurement results of the de-modulated reference pulses. For example, the component may be a means to alter the polarisation or phase of photons, specifically, the component may be a polarisation rotation, delay line or phase modulator or some other means for adjusting a fibre length within the system. Thus, the system may be actively balanced or aligned during transmission of the key.

In a preferred embodiment, the encoding means are phase encoding means comprising an encoding interferometer with an entrance member connected to a long arm and a short arm, said long arm and said short arm being joined at their other ends by an exit member, one of the said arms having a phase modulator which allows the phase of a photon passing through that arm to be set to one of at least two values.

Where the encoding means comprises an interferometer, the decoding means should also comprise a decoding interferometer, said decoding interferometer comprising an entrance member connected to a long arm and a short arm, said long arm and said short arm being joined at their other ends by an exit member, one of said arms having a phase modulator which allows the phase of a photon passing through that arm to be set to at least one of two values.

Typically, the phase modulators will be provided in the short arms. However, the phase modulators may also be provided in the long arms of both interferometers. Only photons which have passed through the long arm of one interferometer and the short arm of the other are of use in communicating the key. In the four-state protocol, which is sometimes referred to as BB84, Alice modulates her phase modulator to one of four different values, corresponding to phase shifts of 0°, 90°, 180° and 270°. Phase 0° and 180° are associated with bits 0 and 1 in a first encoding basis, while 90° and 270° are associated with bits 0 and 1 in a second encoding basis. The second encoding basis is chosen to be non-orthogonal to the first.

Alternatively Phase 0° and 90° are associated with bits 0 and 1 in a first encoding basis, while 270° and 180° are associated with bits zero and one in a second encoding basis. In this case the encoded states are non-orthogonal to one another, they can no longer be discriminated deterministically. Bit discrimination will rely on probabilistic measurement. For example, if bit 0 is encoded with 0° phase delay of basis {0°, 90°}, the measurement basis is only compatible when the receiver project the incoming state to the quantum state 270°. The receiver can be sure he detects a photon with bit 0 if the incoming photon is projected into the quantum state 270°. In this way, only half of the total photons with phase delay 0° are correctly projected, but no probability of photon with phase delay 90° are projected.

In order to increase the bit rate, it is preferable for the system to comprise polarisation directing means for directing photons which have passed through the long arm of the encoding interferometer through the short arm of the decoding interferometer and for directing photons which have passed through the short arm of the encoding interferometer through the long arm of the decoding interferometer.

These means may be achieved by configuring the encoding interferometer to ensure that photons which have passed through the long arm of the interferometer exit the interferometer with a first polarisation and photons which have passed through the short arm of the interferometer exit the interferometer with a second polarisation. The first polarisation being orthogonal to the second polarisation direction. A polarisation beam splitter may then be provided as the entrance member to the decoding interferometer to direct photons with the first polarisation along the short arm of the decoding interferometer and photons with the second polarisation through the long arm of the decoding interferometer.

Previously, a system has been described comprising polarisation directing means which ensures that photons which pass along the long path of one interferometer pass through the short path of the other interferometer. In such a system, where there is no variation in the polarisation due to the passage of photons through the fibres, a detector provided at an output of the exit member of the decoding interferometer would expect to just detect a single peak due to photons flowing along the long path of one interferometer and the short path of the other. However, if the polarisation of the photons is varied during their passage though the emitter and receiver or though the fibre link connecting the emitter and receiver, some photons will flow along both long paths through the interferometers and some photons will pass through both short paths of the two interferometers. Thus, an early satellite peak is seen due to photons which pass through the two short arms and a late satellite peak is seen due to photons which pass through the two long arms. Thus, when the receiver expects to receive a reference peak, it may be configured to monitor either the late or early satellite peak. The presence of either of these peaks indicates that the polarisation of the photons is being rotated as it passes through the fibres of the system.

Preferably, the receiver comprises a polarisation controller positioned in the photon path prior to the decoding means. The detectors may be connected to a feedback circuit which controls the polarisation rotator in order to correct the polarisation directions prior to the decoding means.

It is also desirable to correct for any rotations in the polarisation direction in systems which do not use polarisation directing means. One reason for this is that phase modulators are sensitive to the polarisation direction, variations in the polarisation may still increase the bit error rate. In systems which do not use polarisation directing means, photons in the emitter are generally outputted with just a single polarisation direction.

The reference pulse may also be used to stabilise and monitor the phase of the system. This is achieved by monitoring the error rate of the measurement of the demodulated reference pulses. Preferably, the demodulation of the reference pulses is arranged in such a way that the reference pulse undergoes constructive or destructive interference and the receiver knows which detector is expected to registered a photon detection. By monitoring the ratio of reference photons hitting the unexpected detector to total reference photons detected, Bob can work out the error rate of the reference pulse detection. Any drift in the phase of the system will be manifested by an increase in the error rate determined for the reference pulses.

Preferably, integration means are provided so that the count rate may be integrated over a period of time in order to average statistical fluctuations in the arrival rate of the reference pulse. The integration time may typically be a fraction of a second, for example, 0.1 seconds.

Preferably, the reference pulse error signal is used with a feedback circuit which is connected to a phase correcting means provided in one of the arms of the decoding interferometer. The phase correcting means may be provided by a variable fibre stretcher or a variable air gap, etc. Alternatively, the phase correcting means may be provided by an adjustment means for the phase modulator of the receiver to allow the phase to be balanced. In other words, feedback is used to re-calibrate the zero points of the phase modulators. Thus, the interferometer phase may be balanced using the results from the reference detector.

In a second aspect, the present invention provides a method of quantum communication said method comprising:

from a sending unit, outputting photon pulses having at least two different intensities and storing information for determining which pulses should be reference pulses and which pulses should be data pulses, the average intensity of the reference pulses being different to the average intensity of the data pulses; and in a receiving unit, receiving pulses from the sending unit and determining which of the received pulses are data pulses and which are reference pulses from stored information in the receiving unit and determining the calibration of the quantum communication system by measuring the received data pulses.

The reference pulses may have at least two intensity levels and the intensities of the reference pulses may be varied in a predetermined sequence. The data pulses may have at least two intensity levels and the intensities of the data pulses may be varied in a predetermined sequence.

The pulses may be output in a periodic sequence and the output times of the data and reference pulses are preferably determined by information preshared by the sending unit and receiving unit. The positions of the reference pulses within the sequence of pulses is preferably determined by a random number shared or generated by the sending unit and receiving unit.

The reference pulses are preferably modulated or encoded with predetermined values shared by the sending unit and receiving unit. Alternatively, the reference pulses may have a fixed or null modulation applied to them in the sending unit.

As previously discussed the photon detection rates of different pulses received by the receiving unit may be used to determine an upper bound on the fraction of detected data pulses which derive from multiphoton pulses output from the sending unit.

The present invention will now be described with reference to the following non-limiting embodiments in which:

FIG. 1a is a schematic of a sending unit from a known quantum communication system, FIG. 1b is plot of the signal against time for the sending unit of FIG. 1a;

FIG. 2a is a schematic of a sending unit from a known quantum communication system, FIG. 2b is plot of the signal against time for the sending unit of FIG. 2a;

FIG. 3a is a schematic of a sending unit in accordance with a preferred embodiment of the present invention, FIG. 3b is plot of the signal against time for the sending unit of FIG. 3a;

FIG. 5a is a plot of the clock signal against time for the system of FIG. 4a, FIG. 5b is a plot of the signal laser output against time for the system of FIG. 4a, FIG. 5c is a plot of the probability of a photon arriving at either of the detectors of the system of FIG. 4a and FIG. 5d is a plot of the modulator bias against time applied to the interferometers of FIG. 4a;

Figure 4:
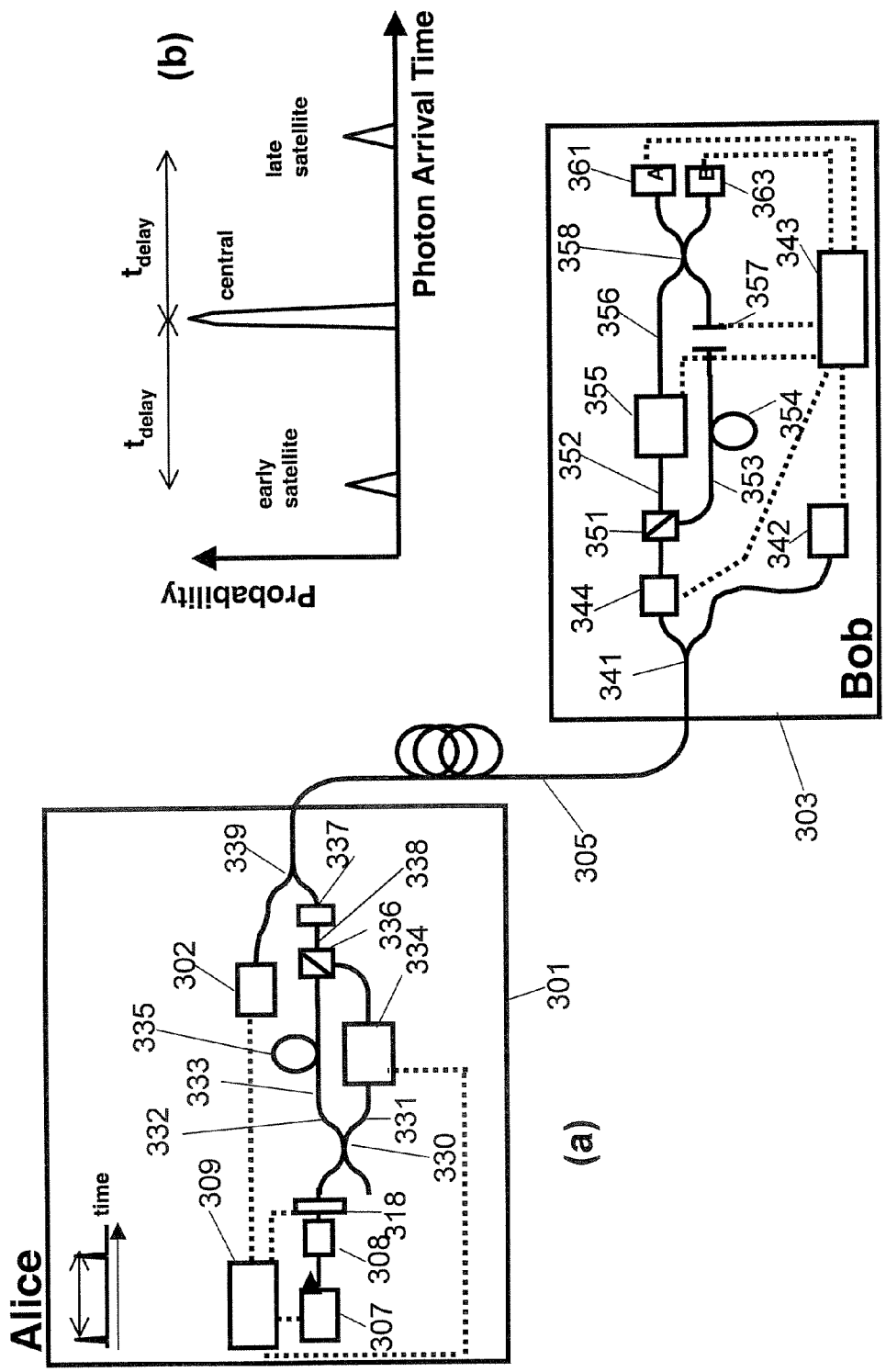
FIG. 4a is a quantum communication system in accordance with a preferred embodiment of the present invention where a reference signal is sent using a code division technique and FIG. 4b is plot of the probability of a photon arriving at either of the detectors in the system of FIG. 4a against time.

FIG. 6a is a plot of the clock signal against time for the system of FIG. 4a, FIG. 6b is a plot of the signal laser output against time for the system of FIG. 4a, FIG. 6c is a plot of the probability of a photon arriving at either of the detectors of the system of FIG. 4a and FIG. 6d is a plot of the modulator bias against time applied to the interferometers of FIG. 4a; and FIG. 7a is a plot of the clock signal against time for the system of FIG. 4a, FIG. 7b is a plot of the signal laser output against time for the system of FIG. 4a, FIG. 7c is a plot of the probability of a photon arriving at either of the detectors of the system of FIG. 4a and FIG. 7d is a plot of the modulator bias against time applied to the interferometers of FIG. 4a.

FIG. 1a is a schematic of a sending unit. The unit comprises a photon source 101 which outputs photon pulses to a polarisation rotator 103. The polarisation rotator 103 is configured to correct the polarisation of the photons for encoding. The photons are then passed into encoder 105 which may be a phase encoder comprising an interferometer, a polarisation encoder comprising a polarisation rotator etc. For this example, it will be assumed that the encoder is a phase encoder.

The encoder 105 is operated under the control of a driver 107 which applies a voltage to a phase modulator within encoder 105. For example, when the standard BB84 protocol is used, the photons are encoded into one of four phase states. The driver 107 is connected to a random number generator 109 which randomly selects which of the phase states to apply to a photon passing through the encoder 105.

The photons outputted from encoder 105 are then passed through attenuator 111 which attenuates the photon pulses such that they have a high probability of containing one photon or less.

FIG. 1b is a plot of the signal outputted from the unit of FIG. 1a against time. A regular stream of equally spaced pulses of the same intensity are noted.

Figure 2:
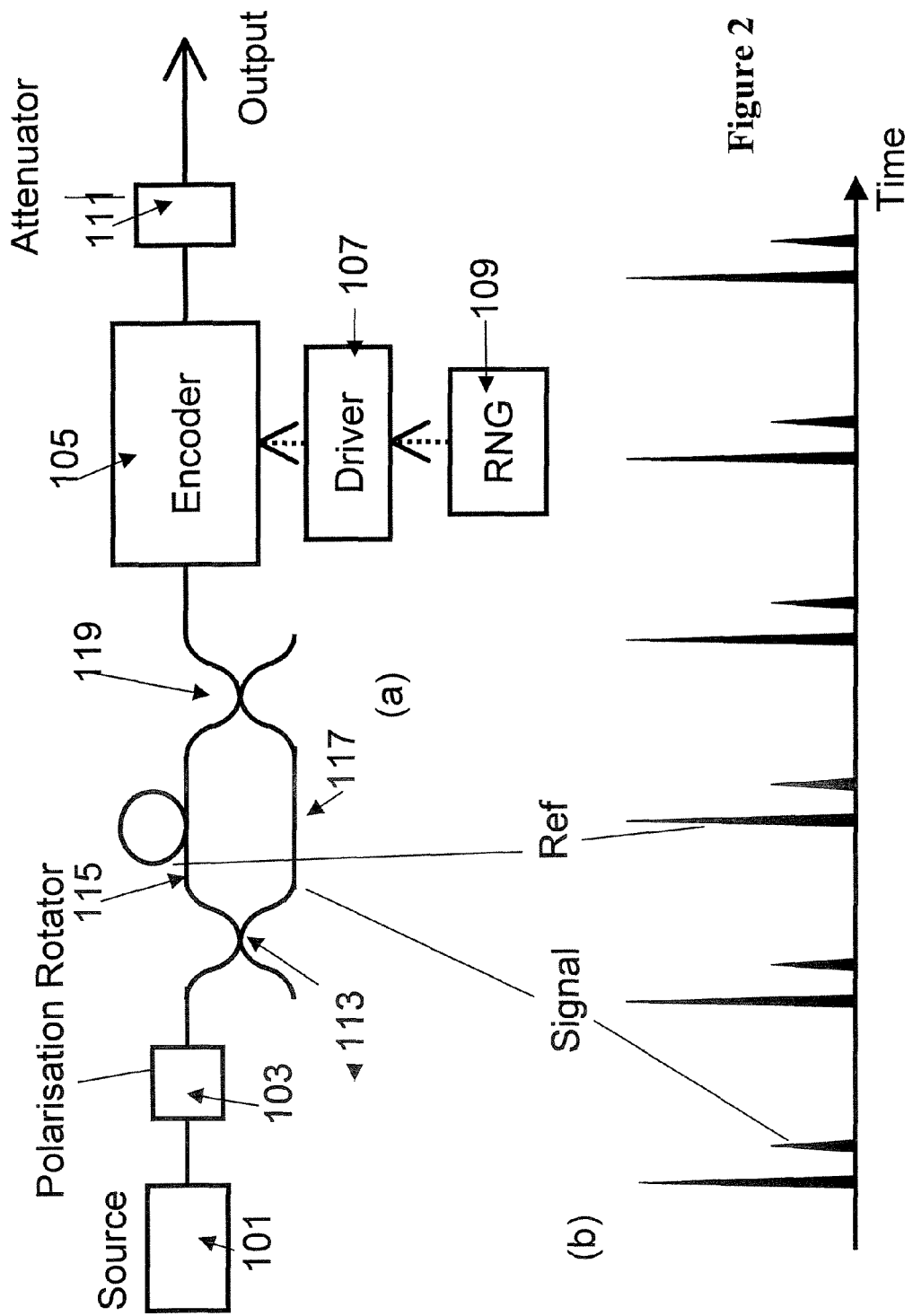

FIG. 2a is schematic of a sending unit from GB 2 404 103 from the same applicant. To avoid unnecessary repetition like reference numerals will be used to denote like features. Photon pulses are outputted from source 101 and their polarisation is corrected by polarisation rotator 103. However, then the pulses are fed into pulse splitter 113. Pulse splitter 113 is imbalanced and configured to split the pulses so that typically 99% of their intensity exits the pulse splitter 113 and enters long arm 115 and the remainder of the pulse enters short arm 117. Long arm 115 has a delay loop. The long arm 115 and the short arm 117 are combined at fibre coupler 119. Fibre coupler 119 thus outputs low intensity pulses (which will become data pulses) followed by higher intensity "reference pulses" which have passed along the long arm.

The pulses from beam combiner 119 are then passed into encoder 105 which is operated in the same manner as described with reference to FIG. 1a. The encoder is configured to modulate only the low intensity pulses, and the reference pulses are left un-modulated.

FIG. 2b illustrates a plot of the output of the sending unit of FIG. 2a against time. It can be seen that the lower intensity data pulse is followed by a higher intensity reference pulse.

FIG. 3a is a schematic of a sending unit in accordance with a preferred embodiment of the present invention, the unit comprises a source 151 which outputs photon pulses to a polarisation rotator 153. The polarisation rotator corrects the polarisation of photon pulses prior to encoding.

The pulses are then fed into intensity modulator 155. Intensity modulator 155 operates under the control of intensity modulator driver 157. Intensity modulator driver 157 and intensity modulator 155 are configured to work together such that the intensity of each pulse which passes through the modulator 155 can be varied. Thus, unlike the sending unit of FIG. 2, it is possible for reference pulses of higher average intensities to be distributed in a pattern with the data pulses of lower average intensities. There is no need for a reference pulse to be sent with each data pulse.

Figure 1:
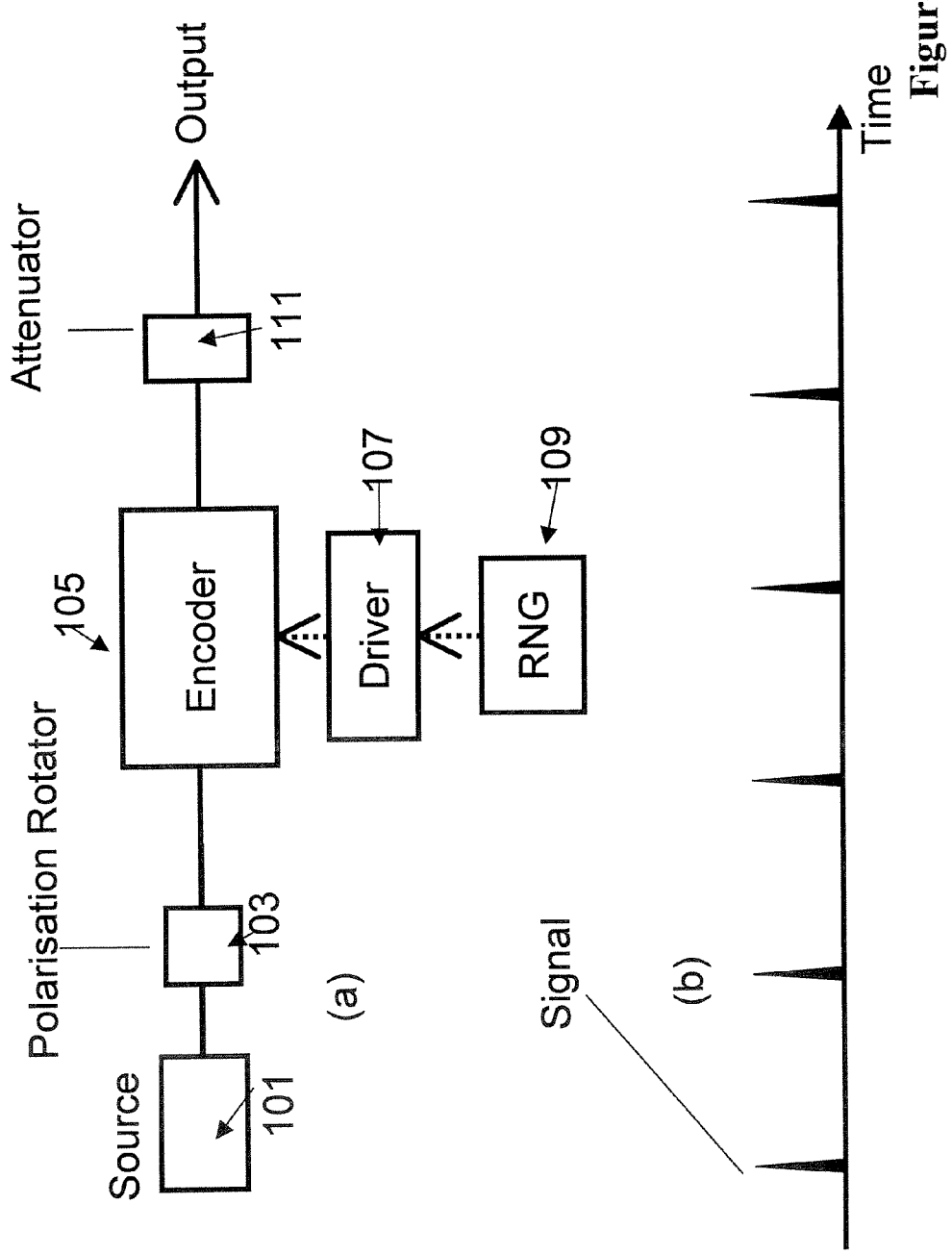

The pulses are then passed into encoder 159 which encodes the photons as described with reference to FIG. 1. The encoder 159 operates under the control of an encoder driver 161 which in turn receives an input from random number generator 163.

Both encoder driver 161 and the intensity modulator driver 157 are controlled by common controller 165. As intensity is used to denote reference pulses, then it may be required to encode reference pulses differently. The pulses outputted from the encoder 159 are then attenuated by fixed attenuator 167.

FIG. 3b illustrates the output of the sending unit of FIG. 3a against time. The reference pulses are distributed throughout the data pulses.

FIG. 4a shows an apparatus for quantum cryptography using active stabilisation where the reference pulses are sent using a code division based technique. Sender "Alice" 301 sends encoded photons to receiver "Bob" 303 over optical fibre 305.

Alice's equipment 301 comprises a signal laser diode 307, a polarisation rotator 308 configured to rotate the polarisation of pulses from signal laser diode 307, an intensity modulator 318 configured to attenuate pulses from the signal laser diode 307 on a pulse by pulse by pulse basis, an imbalanced fibre Mach-Zender interferometer 333 connected to the output of intensity modulator 318, a second fixed attenuator 337 connected to the output of the interferometer 333, a bright clock laser 302, a wavelength division multiplexing (WDM) coupler 339 coupling the output from attenuator 337 and clock laser 302 and bias electronics 309 connected to said signal laser diode 307 and clock laser 302. The intensity modulator 318 can be a fibre-optic intensity modulator.

The interferometer 333 comprises an entrance coupler 330, one exit arm of entrance coupler 330 is joined to long arm 332, long arm 332 comprises a loop of fibre 335 designed to cause an optical delay, the other exit arm of entrance coupler 330 is joined to a short arm 331, short arm 331 comprises phase modulator 334, an exit polarising beam combiner 336 is connected to the other ends of long arm 332 and short arm 331. All components used in Alice's interferometer 333 are polarisation maintaining.

During each clock signal, the signal diode laser 307 outputs one optical pulse. The signal diode laser 307 is connected to biasing electronics 309 which instruct the signal diode laser 307 to output the optical pulse. The biasing electronics are also connected to clock laser 302.

The linear polarisation of the pulses outputted by diode laser 307 is rotated by a polarisation rotator 308 so that the polarisation of the pulse is aligned to be parallel to a particular axis of the polarisation maintaining fibre (usually the slow axis) of the entrance coupler 330 of the interferometer 333. Alternatively the polarisation rotator 308 may be omitted by rotating the signal laser diode 307 with respect to the axes of the entrance polarisation maintaining fibre coupler 330.

After passing through the polarisation rotator (if present) the pulses are then passed through the intensity modulator 318. Intensity modulator 318 is configurable to vary the intensity of pulses which it passes on a pulse by pulse basis. The modulator is configured to attenuate some pulses more strongly than others to form data pulses and reference pulses. The strongly attenuated pulses (lower intensity pulses) are used as data pulses and the higher intensity pulses are used as reference pulses. How the intensity modulator is exactly configured will be described with reference to timing diagrams 5 to 7.

After being attenuated, the pulses (both data and reference) are then fed into the imbalanced Mach-Zender interferometer 333 through a polarisation maintaining fibre coupler 330. Data pulses are coupled into the same axis (usually the slow axis) of the polarisation maintaining fibre, of both output arms of the polarisation maintaining fibre coupler 330. One output arm of the fibre coupler 330 is connected to the long arm 332 of the interferometer while the other output arm of the coupler 330 is connected to the short arm 331 of the interferometer 333.

The long arm 332 of the interferometer 333 contains an optical fibre delay loop 335, while the short arm 331 contains a fibre optic phase modulator 334. The fibre optic phase modulator 334 is connected to biasing electronics 309 which will be described in more detail later. The length difference of the two arms 331 and 332 corresponds to an optical propagation delay of $t_{delay}$. Typically the length of the delay loop 335 may be chosen to produce a delay $t_{delay}$~5 ns. Thus, a photon travelling through the long arm 332 will lag that travelling through the short arm 331 by a time of $t_{delay}$ at the exit 336 of the interferometer 333.

The two arms 331, 332 are combined together with a polarisation beam combiner 336 into a single mode fibre 338. The fibre inputs of the polarisation beam combiner 336 are aligned in such a way that only photons propagating along particular axes of the polarisation maintaining fibre, are output from the combiner 336. Typically, photons which propagate along the slow axis or the fast axis are output by combiner 336 into fibre 338.

The polarising beam combiner 336 has two input ports, an in-line input port and a 90° input port. One of the input ports is connected to the long arm 332 of the interferometer 333 and the other input port is connected to the short arm 331 of the interferometer 333.

In this example, only photons polarised along the slow axis of the in-line input fibre of the in-line input port are transmitted by the polarising beam combiner 336 and pass into the fibre 338. Photons polarised along the fast axis of the in-line input fibre of the input port are reflected and lost.

Meanwhile, at the 90° input port of the beam coupler 336, only photons polarised along the slow axis of the 90° input fibre are reflected by the beam combiner 336 and pass into the output port, while those polarised along the fast axis will be transmitted out of the beam combiner 336 and lost.

This means that the slow axis of one of the two input fibres is rotated by 90° relative to the output port. Alternatively the polarisation may be rotated using a polarisation rotator (not shown) before one of the input ports of the polarising beam combiner 336.

Thus, photon pulses which passed through the long 332 and short arms 331 will have orthogonal polarisations.

The pulses are then strongly attenuated by the attenuator 337 so that the average number of photons per data pulse $\mu \ll 1$. The reference pulses are also attenuated by attenuator 337. However, as the reference pulses initially have a much higher intensity than the data pulses, they still, on average, possess 10 to 10,000 photons after attenuation by attenuator 337.

The pulses which are outputted by the combiner 336 into single mode fibre 338 are then multiplexed with a bright laser clock source 302 at a different wavelength using a WDM coupler 339. The multiplexed pulses are then transmitted to the receiver Bob 303 along an optical fibre link 305. The biasing electronics 309 synchronises the output of the clock source 302 with the data pulse.

Bob's equipment 303 comprises WDM coupler 341, a clock recovery unit 342 connected to an output of coupler 341, a polarisation controller 344 connected to the other output of WDM coupler 341, an imbalanced Mach-Zender interferometer 356 connected to the output of polarisation controller 344, two single photon detectors A 361, B 363 connected to the output arms of interferometer 356 and biasing electronics 343 connected to the detectors 361, 363. Bob's interferometer 356 contains an entrance polarising beam splitter 351 connected to both: a long arm 353 containing a delay loop 354 and a variable delay line 357; and a short arm 352 containing a phase modulator 355. The long arm 353 and short arm 352 are connected to an exit polarisation maintaining 50/50 fibre coupler 358. All components in Bob's interferometer 356 are polarisation maintaining.

Bob first de-multiplexes the pulses received from Alice 301 via fibre 305 using the WDM coupler 341. The bright clock laser 302 signal is routed to an optical receiver 342 to recover the clock signal for Bob 303 to synchronise with Alice 301.

The data pulses which are separated from the clock pulses by WDM coupler 341 are fed into a polarisation controller 344 to restore the original polarisation of the data pulses. This is done so that data pulses which travelled the short arm 331 in Alice's interferometer 333, will pass the long arm 353 in Bob's interferometer 356. Similarly, data pulses which travelled through the long arm 332 of Alice's interferometer 333 will travel through the short arm 352 of Bob' interferometer.

The signal then passes through Bob's interferometer 356. An entrance polarising beam splitter 351 divides the incident pulses with orthogonal linear polarisations. The two outputs of the entrance polarisation beam splitter 351 are aligned such that the two output polarisations are both coupled into a particular axis, usually the slow axis, of the polarisation maintaining fibre. This ensures that data pulses taking either arm will have the same polarisation at the exit 50/50 polarisation maintaining coupler 358. The long arm 353 of Bob's interferometer 356 contains an optical fibre delay loop 354 and a variable fibre delay line 357, and the short arm 352 contains a phase modulator 355. The two arms 352, 353 are connected to a 50/50 polarisation maintaining fibre coupler 358 with a single photon detector A 361, B 363 attached to each output arm.

Due to the use of polarising components, there are, in ideal cases, only two routes for a data pulse travelling from the entrance of Alice's interferometer to the exit of Bob's interferometer:

(i) Alice's Long Arm 332—Bob's Short Arm 352 (L-S) and
(ii) Alice's Short Arm 331—Bob's Long Arm 353 (S-L).

The variable delay line 357 at Bob's interferometer 356 is adjusted to make the propagation time along routes (i) and (ii) almost equal, within the signal laser coherence time which is typically a few picoseconds for a semiconductor distributed feed back (DFB) laser diode, and thereby ensure interference of the two paths. This is assured by presetting the coarse delay of the variable fibre delay line 357 prior to assembling the receiving unit. The variable delay line 357 can also be put in one of the arms of Alice's interferometer 351, and other means to vary fine phase delay at Bob's interferometer 353 should be used, for example, using a fibre stretcher or applying a DC bias on Bob's phase modulator 355.

FIG. 4b is a plot of probability of a photon arriving at either of detectors A 361, B 363 against time. The early satellite signal peak shown in FIG. 4b is due to photons travelling through Alice's short arm 331 to Bob's short arm 352, and the late satellite signal peak is due to those travelling through Alice's long arm 332 to Bob's long arm 353. Photons taking these non-ideal routes are due to incomplete polarisation control by the polarisation controller 344, and they reduce quantum key distribution rate. So, Bob has to adjust the polarisation controller 344 prior to key distribution to minimise the strength of the satellite signal pulses in FIG. 4b.

By controlling the voltages applied to their phase modulators 334, 355, Alice and Bob determine in tandem whether paths (i) and (ii) undergo constructive or destructive interference at detectors A 361 and B 363. The phase modulators 334, 355 are connected to respective biasing means 309 and 343 to ensure synchronisation.

The variable delay line 357 can be set such that there is constructive interference at detector A 361 (and thus destructive interference at detector B 363) for zero phase difference between Alice and Bob's phase modulators. Fine phase adjustment can also be achieved using fibre stretcher or applying a DC bias upon the phase modulator 355. Thus for zero phase difference between Alice's and Bob's modulators and for a perfect interferometer with 100% visibility, there will be a negligible count rate at detector B 363 and a finite count rate at A 361.

If, on the other hand, the phase difference between Alice and Bob's modulators 334, 355 is 180°, there should be destructive interference at detector A 361 (and thus negligible count rate) and constructive at detector B 363. For any other phase difference between their two modulators, there will be a finite probability that a photon may be received at detector A 361 or detector B 363.

In the four-state protocol, which is sometimes referred to as BB84, Alice sets the voltage on her phase modulator to one of four different values, corresponding to phase shifts of 0°, 90°, 180°, and 270°. Phase 0° and 180° are associated with bits 0 and 1 in a first encoding basis, while 90° and 270° are associated with 0 and 1 in a second encoding basis. The second encoding basis is chosen to be non-orthogonal to the first. The phase shift is chosen at random for each data pulse and Alice records the phase shift applied for each clock cycle.

Meanwhile Bob randomly varies the voltage applied to his phase modulator between two values corresponding to 0° and 90°. This amounts to selecting between the first and second measurement bases, respectively. Bob records the phase shift applied and the measurement result (i.e photon at detector A 361, photon at detector B 363, photon at detector A 361 and detector B 363, or no photon detected) for each clock cycle.

In the BB84 protocol, Alice and Bob can form a shared key by communicating on a classical channel after Bob's measurements have taken place. Bob tells Alice in which clock cycles he measured a single photon and which measurement basis he used, but not the result of the measurement. Alice then tells Bob the clock cycles in which she used the same encoding basis and they agree to keep only those results, as in this case Bob will have made deterministic measurements upon the encoded photons. This is followed by error correction, to remove any errors in their shared key, and privacy amplification to exclude any information known to an eavesdropper.

The system of FIG. 4a is capable of providing active stabilisation by using detection of the reference pulses as a feedback to correct any system drift. Attenuator 318 allows low intensity data pulses and higher intensity reference pulses to be passed through both Alice's modulator 333 and Bob's modulator 353. It is desirable for reference pulses to have a higher intensity because this means that less reference pulses need to be measured in order to perform active compensation and hence the system duty cycle is substantially improved.

How the reference pulses are modulated and whether or not they are modulated will be described with reference to FIGS. 5 to 7. Also, how the reference pulses are initially selected will also be described with reference to FIGS. 5 to 7.

Depending on the modulation applied by Alice and Bob, reference pulses will arrive at either detector A 361 or B 363. Alice and Bob will have pre-agreed which pulses are the reference pulses. This may be done by deciding that reference pulses are sent to every n cycles where n is an integer of at least 1 or by sharing some pre-agreed pattern. Preferably, the pre-agreed pattern is a pseudo-random pattern which may be generated by Alice and Bob from a seed.

The reference pulses received at either detector A 361 or B 363 are monitored. Since Bob should have the information which allows him to determine which detector should register a count when a reference pulse is received, the actual measured count rate of reference pulses can be compared to the predicted count rate of reference pulses. If there is a variation in these two figures, there must be a phase drift in either or both of Alice and Bob's interferometers.

The electronics associated with detectors A 361 and B 363 should integrate the count rate of the reference pulses over a period of time in order to average statistical fluctuation in arrival rate of the reference photons. This integration may typically be a fraction of a second, for example 0.1 second. Such feedback times are sufficient since the phase drift of Alice and Bob's interferometers occurs on much longer time scales. For highly unstable environments, much shorter feedback times, for example 10 ms may be employed.

Bias electronics 343 are capable of controlling any phase drift within Bob's interferometer by either controlling delay line 357 or by applying a DC bias to modulator 355. Applying a bias to modulator 355 has the effect of varying the phase shift applied by modulator 355 and hence correcting any phase drift in the system.

The feedback electronics may also condition system for sudden shocks to the system, such as a sudden change in temperature. If a sudden change in the actual count rate of reference pulses is detected, the system may be configured to ignore data from data pulses until the actual count rate for reference pulses returns to the predicted count rate for reference pulses.

The references pulses are also used to actively monitor and stabilise the polarisation drift of photons. The two satellites peaks of the reference peak in FIG. 4b are due to imperfect polarisation control by the controller 344 and therefore imperfect polarisation beam splitting of the entrance polarisation beam splitter 351 of Bob's interferometer 356. The early satellite peak arises from the short arm 331 of Alice's encoding interferometer 333 to Bob's Short Arm 352, and the late satellite peak arises from the long arm 332 of Alice's encoding interferometer 333 to Bob's long arm 353. By gating the detector which is expected to receive a reference peak to be on during the expected arrival time of one of the satellite peaks and measure the photon counting rate, Bob can monitor the drift in the polarisation of the photons and actively stabilise it by feeding the measurement result back into the polarisation controller 344. The polarisation controller 344 rotates the polarisation of photons so as to minimise the count rate of the satellite peaks of the reference pulses.

Again, as for correcting phase, the reference pulses counted to correct polarisation should be integrated over a certain period of time in order to reduce statistical fluctuation. The integration time can again be as short as a fraction of a second, for example, 0.1 second. This is typically much faster than the time scale over which the polarisation drifts. Much shorter integration time can be chosen for system operates in unstable conditions.

Figure 5:
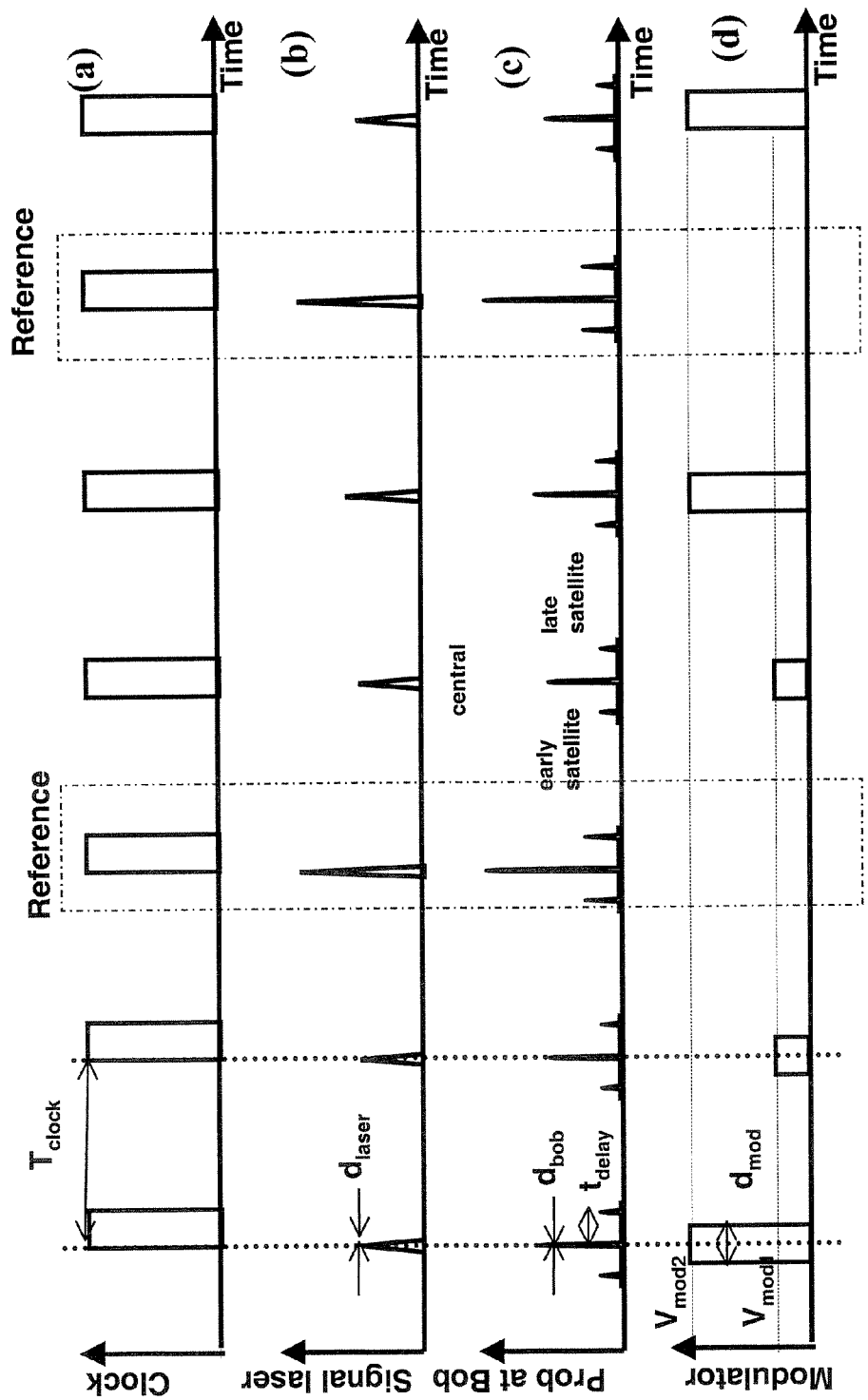

FIG. 5 shows plots of the timing schemes which may be used to operate the quantum cryptography system of FIG. 4a.

FIG. 5a shows the clock signal produced by the biasing electronics 309 as a function of time. The clock has a repetition period $T_{clock}$. The rising edge of the clock signal is used to synchronise Alice's signal laser 307, Alice's phase modulator 334, Bob's phase modulator 355 and Bob's detectors A 361 and B 363.

The attenuated output of the signal laser 307 is shown in FIG. 5b. This is the laser 307 output which has been attenuated by intensity modulator 318. For each clock period, the signal laser 307 is triggered to produce one pulse of width $d_{laser}$. The attenuator 318 is controlled so that each data pulse has a first intensity and each reference pulse has a second intensity. The first intensity is much lower than the second intensity. Further, the reference pulses are selected in at least a partially random manner. This may be achieved by Alice and Bob using the same random pattern generating algorithm and pre-agreeing a shared seed.

FIG. 5c plots the probability of a photon arriving at Bob's detectors A 361 and B 363 (i.e. sum of the probabilities of a photon arriving at detector A or detector B) as a function of time. Each pulse now has a width of $d_{bob}$, which may be greater than $d_{laser}$ due to dispersion in the fibres of the system. Three arrival windows can be seen for each clock cycle. In order of arrival time, these correspond to photons taking the short-short, long-short or short-long and long-long paths through Alice's-Bob's interferometer as described with reference to FIG. 4b. Thus the first and second, as well as the second and third pulses are separated by a time delay $t_{delay}$. The short-short and long-long paths are due to imperfect polarisation beam splitting at the entrance 351 of Bob's interferometer 356.

Only photons arriving in the central window of each clock cycle undergo interference and are thus of interest. Therefore, when Bob expects to receive a data pulse as opposed to a reference pulse, the single photon detectors A 361 and B 363 are gated to be on only when the central pulse arrives in each clock cycle. How a detector may be gated to be "on" and the considerations for gating a detector are explained in detail with reference to FIG. 2.

When receiving the reference pulses the detectors are either gated to be on when the central pulse is expected if the reference pulse is being use to correct for phase drift and when the early and/or late satellite peak is expected if the reference pulse data is used to correct drift in the polarisation of the photons.

Alice's and Bob's phase modulators 334 and 355 are driven by their respective voltage pulse generators. The voltage pulse generators are also synchronised with the clock signal (of FIG. 5a), as shown in FIG. 5d.

During the pass of each data pulse through the phase modulator, the pulse generator outputs one of at least two voltage levels, $V_{mod1}$, $V_{mod2}$ etc. For the BB84 protocol, for instance, Alice applied one of four different voltage levels, corresponding to phase shifts of 0°, 90°, 180° and 270°. Meanwhile Bob applies two voltage levels to his modulator corresponding to phase shifts of 0° and 90°. Alice and Bob vary the applied phase shifts for each data pulse randomly and independently of one-another.

In this particular example, the modulators do not apply an "encoding" phase shift to the reference pulses. However, the modulators may apply a phase shift used to correct phase drift in the system to the reference pulses.

Figure 6:
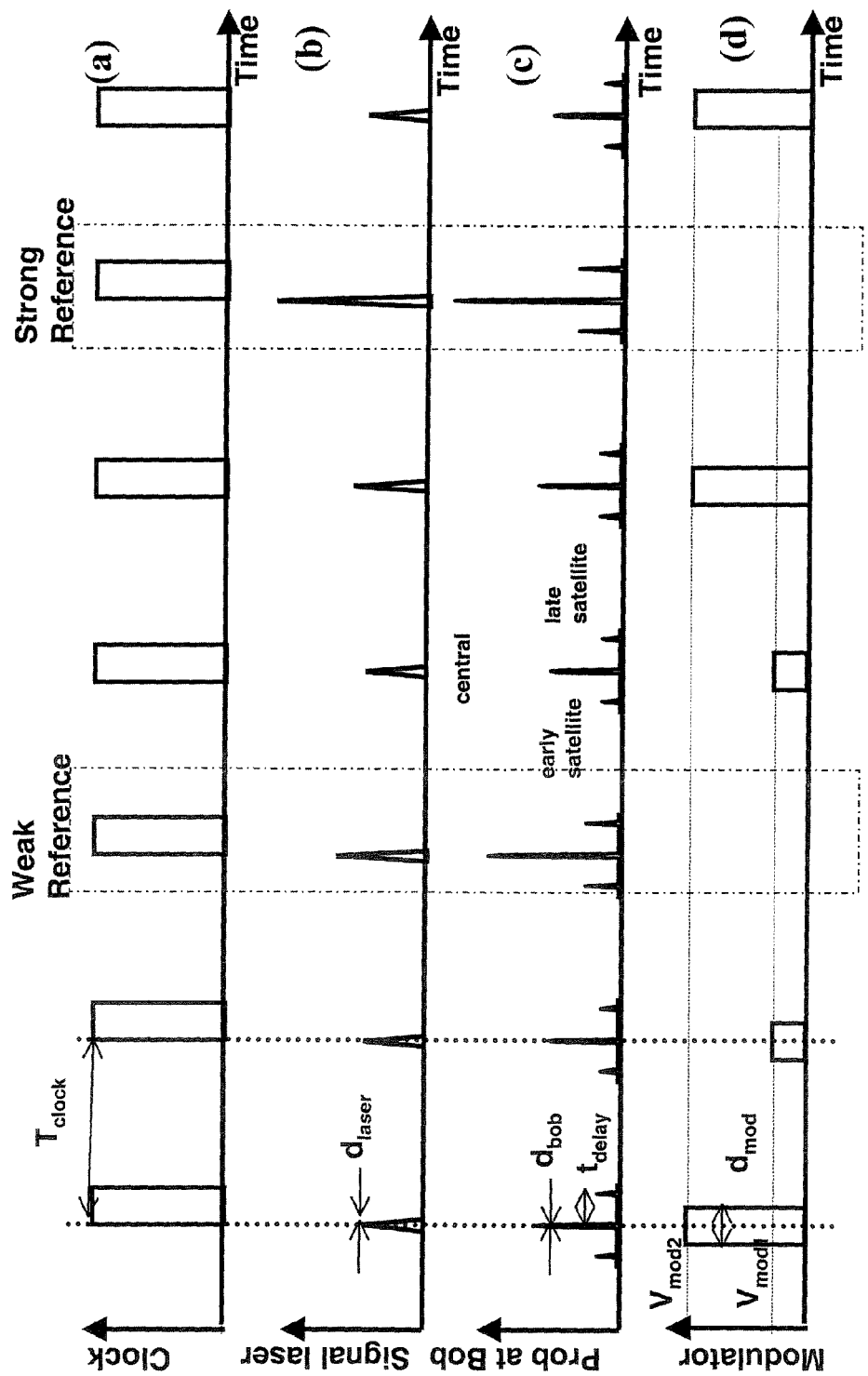

FIG. 6 shows a plot of timing schemes which may be used to control the quantum communication system of FIG. 4a. The timing scheme of FIG. 6 differs from that of FIG. 5 in the attenuation of the laser pulses shown in FIG. 6b. FIG. 6b shows references pulses having two different intensities.

FIG. 6a like FIG. 5a shows the clock signal produced by the biasing electronics 309 as a function of time. The clock has a repetition period $T_{clock}$. The rising edge of the clock signal is used to synchronise Alice's signal laser 307, Alice's phase modulator 334, Bob's phase modulator 355 and Bob's detectors A 361 and B 363.

The attenuated output of the signal laser 307 is shown in FIG. 6b. This is the laser 307 output which has been attenuated by the intensity modulator 318. For each clock period, the signal laser 307 is triggered to produce one pulse of width $d_{laser}$. The attenuator 318 is controlled so that pulses of different average intensities can be produced. In the particular example, data pulses with a first average intensity, weak reference pulse with a second average intensity and strong reference pulses with a third average intensity are produced. The weak reference pulse intensity is set to be comparable to, but different from, that of the data pulses.

Alice and Bob may agree that the reference and data pulses will be sent in a fixed pattern which is repeated indefinitely. For example, they may agree that this fixed pattern consists of one reference pulse, followed by ten data pulses.

More preferably the reference pulses are located at random positions within the pulse sequence, or at positions which are difficult for a third party to guess. In general, the reference pulses can be placed at any locations within the pulse sequence, provided these locations are known to the sender and receiver.

Alice and Bob can pre-agree which pulses are reference pulses by pre-agreeing to use a random number generating algorithm, in conjunction with a shared seed number. The advantage of this implementation is that an eavesdropper will be unable to predict with certainty which pulses are data pulses and which are reference pulses. Thus it is more difficult for the eavesdropper to calibrate their equipment, which means the Eavesdropper will extract less information and will cause more errors in the information shared by the sender and receiver.

Detection of the reference pulses is used as a feedback to control the variable delay line to compensate any phase drift. This compensation can also be down by using a fibre stretcher or applying a DC voltage upon Bob's phase modulator.

As well as allowing calibration and stabilisation of the interferometer, the reference pulses may also be used to guarantee against photon number splitting attacks by a malicious eavesdropper. The photon number splitting attack is one of the most efficient attacks on weak pulse quantum key distribution systems. This vulnerability exists because an attenuated laser will inevitably produce some pulses containing more than one photon. Multi-photon pulses emitted by Alice can allow Eve to gain information about Alice-Bob's shared key without introducing any errors to the key and thereby remaining allowing her to remain hidden.

In the photon number splitting attack, Eve removes and stores one or more photon from each multiphoton pulse and passes the remainder of the pulse to Bob. She can then measure the stored photon after Alice-Bob reveal their encoding bases, and thereby gain full information from that pulse without causing an error in Alice-Bob's shared key. This type of attack is particularly dangerous for systems which use an attenuated laser as the signal source. To achieve secure communication, the contribution of the multiphoton pulses to Alice-Bob's shared key must be removed through privacy amplification.

By monitoring the detection rate of the data and the weak reference pulses, which have different average intensities, Alice and Bob may estimate an upper bound on the fraction of Bob's data measurements that are caused by multi-photon pulses emitted by Alice. Using this upper bound Alice and Bob may form a secure key using privacy amplification, as described below.

Preferably Alice and Bob estimate the fraction of Bob's measurements resulting from multi-photon pulses using two sets of pulses whose average intensities are of the same order. This may be achieved by using two distinct intensities of data pulse, or by using two distinct average intensities of reference pulses. In the latter case, the strong reference pulses are used primarily to calibrate and stabilise the interferometer, while the weak reference pulses are used to estimate the upper bound of the fraction of photon detection caused by multi-photon pulses emitted by Alice among all data photon detections made by Bob.

The average intensity ($\mu'$) of the second group of data pulses or the weak reference pulses is comparable to, but different from, the data pulses ($\mu$). The weak coherent pulses and the data pulses obey Poissonian photon number distributions: $P^{\mu}(n) = \mu^n e^{-\mu}/n!$ for data pulses with average photon number of $\mu$ per pulse, and $P^{\mu'}(n) = \mu'^n e^{-\mu'}/n!$ for the weak reference pulses with average photon of $\mu'$ per pulse. $P(n)$ represents the probability of a pulse containing n photons within a certain group of pulses.

When Eve applies the photon number splitting attack to the multiphoton pulses, she has to treat the data pulses and weak reference pulses equally because she is not able to distinguish between them. By attacking the multiphoton pulses indiscriminately, she will cause a difference in transmission efficiency of the data pulses and the weak reference pulses because the two different groups have different average intensities and thus different proportions of pulses containing more than one photons. By analysing the transmissions carefully, the upper bound on the fraction of multiphoton pulses that contribute to Bob's measurements can be estimated. With knowledge of this upper bound, Alice and Bob can perform privacy amplification to remove any information which may be obtained by Eve.

A protocol in accordance with an embodiment of the invention with reference pulses of varying intensities operates as follows:
1) Alice starts sending data pulses and reference pulses to Bob; Reference pulses position and intensities are determined by a deterministic pseudo-random number which is known to both Alice and Bob.
2) Detection of strong reference pulses are used to stabilise the quantum key distribution system, including phase compensation and polarisation correction.
3) After accumulating a sufficiently large number of photon detection events from the data pulses and the weak reference pulses. Bob can work out channel transmission for photon pulses with different photon flux ($\mu$, $\mu'$ and etc). The number of photon detection events has to be sufficiently big in order to minimise statistical fluctuations.
4) From the transmission coefficiencies, Bob evaluates the upper bound of contributions from multiphoton pulses to the photon detection of the data pulses.
5) If the bound is bigger than a certain security limit, Bob discards all data collected, and informs Alice to re-start the protocol.

6) If the bound is smaller than the security limit, Alice and Bob agree to keep signal photon detection events, and sift keys from the raw data. Bob informs Alice the clock cycle numbers and encoding bases he used of all signal photon detection events; Alice compares Bob's basis with her own, and informs Bob to keep those when they use same basis. After the sifting process, both Alice and Bob have a bit sequence. Most of bit value of the two sequences agree with each other, but some differ. The percentage of the bits that differ is called quantum bit error rate. The sifting process can also be done simultaneously with sending pulses.

7) With the information of the quantum bit error rate and the upper bound of multiphoton contribution, Alice and Bob can apply error correction, followed by privacy amplification, and thereby form a shared secret bit sequence, which can be used for key generation.

To estimate the upper bound of the multiphoton contribution, Bob needs to know the dark count rate of his detectors. This can be done by calibrating his detectors before quantum key distribution process. Alternatively Alice can send reference pulses which have 100% probability of containing no photons. Producing these empty reference pulses cannot be achieved reliably using an intensity modulator. A preferable way to achieve empty pulses is for Alice to simply send no pulse, by omitting a trigger to the signal laser diode. This can be easily done by using an-AND gate with triggering signal as one input and another digital input controlled by Alice's computer. When digital input is set to zero, then no trigger will be applied to the signal laser and therefore no photons will be emitted by the signal laser diode. This is equivalent to producing an empty pulse with 100% success.

In the above protocol, Bob knows positions of the weak reference pulses and therefore he estimates the upper bound of multiphoton contribution. The protocol can be modified to work even when Bob does not know the positions of the weak reference pulses. In this case, Alice alone determines positions of the weak reference pulses randomly. Bob is not able to distinguish the data pulses and the reference pulses, and therefore he cannot deduce channel transmissions for different states. Instead, Bob informs Alice the clock numbers at which he detects a photon from either the data pulses or the weak reference pulses. With the photon detection information, Alice can work out the channel transmission, and she is then able to evaluate the channel transmission for different kinds of pulses. Alice estimates the upper bound of the multiphoton contribution, and this bound will be used for privacy amplification.

FIG. 6c plots the probability of a photon arriving at Bob's detectors A 361 and B 363 (i.e. sum of the probabilities of a photon arriving at detector A or detector B) as a function of time. As explained with reference to FIG. 6c, only photons arriving in the central window of each clock cycle undergo interference and are thus of interest. Therefore, when Bob expects to receive a data pulse as opposed to a reference pulse, the single photon detectors A 361 and B 363 are gated to be on only when the central pulse arrives in each clock cycle. How a detector may be gated to be "on" and the considerations for gating a detector are explained in detail with reference to FIG. 4a.

As for FIG. 5c, when receiving the reference pulses the detectors are either gated to be on when the central pulse is expected if the reference pulse is being use to correct for phase drift and when the early and/or late satellite peak is expected if the reference pulse data is used to correct drift in the polarisation of the photons.

Alice's and Bob's phase modulators 334 and 355 are driven by separate voltage pulse generators. The voltage pulse generators are also synchronised with the clock signal (of FIG. 5a), as shown in FIG. 5d.

During the pass of each data pulse through the phase modulator, the pulse generator outputs one of a number of voltage levels, $V_{mod1}$, $V_{mod2}$ etc. For the BB84 protocol, for instance, Alice applied one of four different voltage levels, corresponding to phase shifts of 0°, 90°, 180° and 270°. Meanwhile Bob applies two voltage levels to his modulator corresponding to phase shifts of 0° and 90°. Alice and Bob vary the applied phase shifts for each data pulse randomly and independently of one-another.

In this particular example, the modulators do not apply an "encoding" phase shift to the reference pulses. However, the modulators may apply a phase shift used to correct phase drift in the system to the reference pulses.

Figure 7:
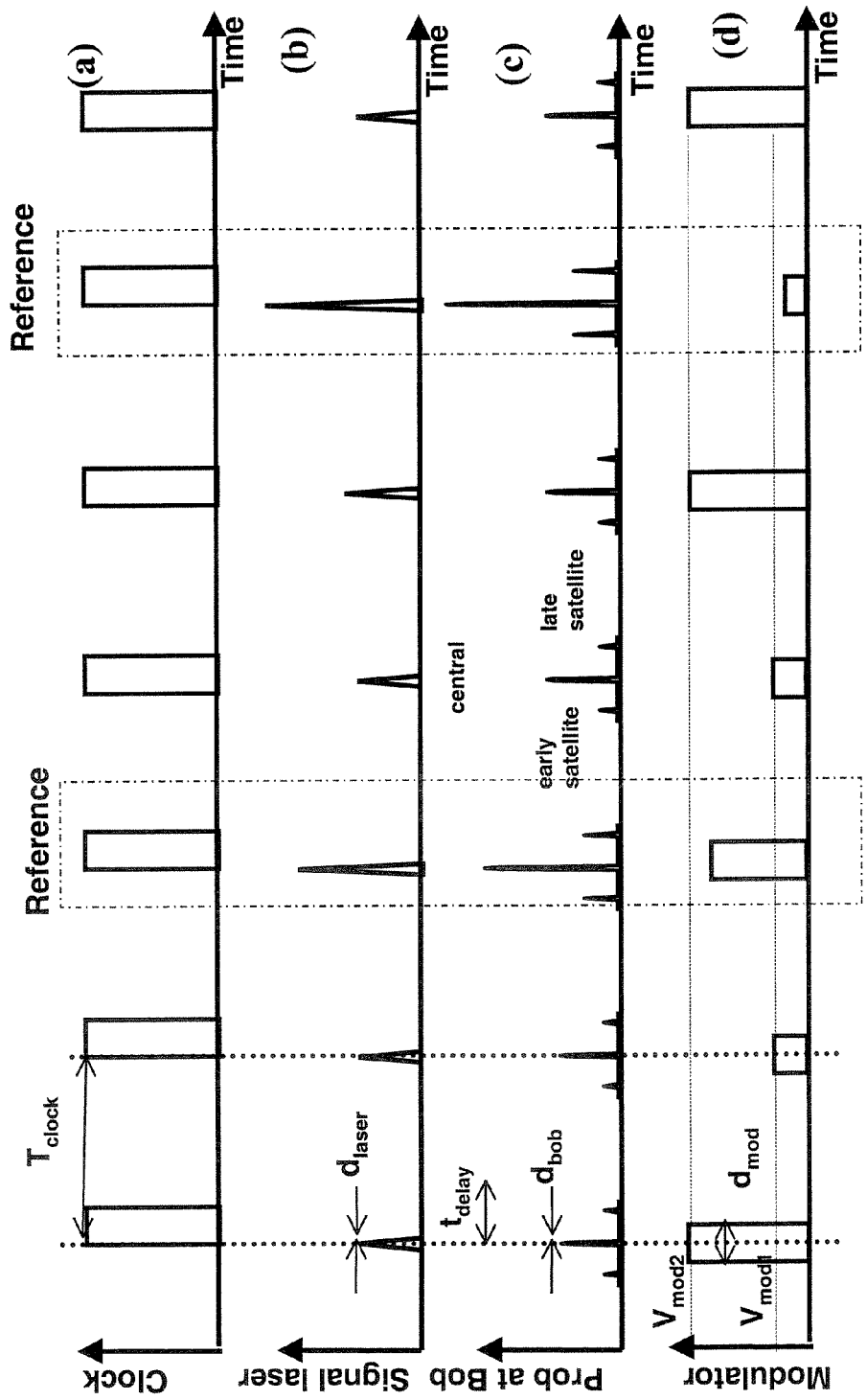

FIG. 7 shows a plot of timing schemes which may be used to control the quantum communication system of FIG. 4a. The timing scheme of FIG. 7 differs from that of FIG. 6 in the modulation (demodulation) of the laser pulses shown in FIG. 7d.

FIG. 7a like FIG. 6a shows the clock signal produced by the biasing electronics 309 as a function of time.

The attenuated output of the signal laser 307 is shown in FIG. 7b. Like FIG. 6b, the attenuator 318 is controlled so that each data pulse has a first intensity and each reference pulse has a varying intensity. The intensity of the data pulses is much lower than the intensity of the reference pulses. The intensity of the reference pulses varies in at least a partially random manner, but in a manner which may be determined by Bob so that he can identify which pulses are reference pulses. This may be achieved by Alice and Bob using the same random pattern generating algorithm and pre-agreeing a shared seed.

FIG. 7c plots the probability of a photon arriving at Bob's detectors A 361 and B 363 (i.e. sum of the probabilities of a photon arriving at detector A or detector B) as a function of time. As explained with reference to FIG. 6c, only photons arriving in the central window of each clock cycle undergo interference and are thus of interest. Therefore, when Bob expects to receive a data pulse as opposed to a reference pulse, the single photon detectors A 361 and B 363 are gated to be on only when the central pulse arrives in each clock cycle.

As for FIG. 6c, when receiving the reference pulses the detectors are either gated to be on when the central pulse is expected if the reference pulse is being use to correct for phase drift and when the early and/or late satellite peak is expected if the reference pulse data is used to correct drift in the polarisation of the photons.

Alice's and Bob's phase modulators 334 and 355 are driven by separate voltage pulse generators. The voltage pulse generators are also synchronised with the clock signal (of FIG. 7a), as shown in FIG. 7d.

During the pass of each data pulse through the phase modulator, the pulse generator outputs one of a number of voltage levels, $V_{mod1}$, $V_{mod2}$ etc. For the BB84 protocol, for instance, Alice applied one of four different voltage levels, corresponding to phase shifts of 0°, 90°, 180° and 270°. Meanwhile Bob applies two voltage levels to his modulator corresponding to phase shifts of 0° and 90°. Alice and Bob vary the applied phase shifts for each data pulse randomly and independently of one-another.

In this particular example, the modulators also apply a phase modulation to the reference pulses. The modulation information to the reference pulses are pre-shared with Bob, so he is able to demodulate the reference pulses to obtain the error rate of the reference pulse detection which is then used as a feedback to actively stabilise the system. Modulating the reference pulses allows a further level of security because it prevents Eve from calibrating her equipment to measure the encoding data pulses.

The invention claimed is:

1. A quantum communication system comprising a sending unit and a receiving unit, said sending unit comprising a photon source assembly configured to output a stream of pulses of light with each pulse having one of at least two different intensities and a memory configured to store information for determining which pulses should be reference pulses and which pulses should be data pulses, the average intensity of reference pulses being different to the average intensity of data pulses, said reference pulse multiplexed in time with said data pulses, wherein the number of reference pulses per unit time differs from the number of signal pulses per unit time, the receiving unit comprising a memory for storing information for identifying the position of reference pulses within the stream of pulses and a processor for determining the calibration of the quantum communication system from the reference pulses, wherein the sending unit and the receiving unit are configured to share information for determining the position in the stream of pulses of light of the reference pulses and the data pulses before the stream of pulses of light is output by the sending unit.

2. A quantum communication system according to claim 1, wherein the average intensity of the reference pulses is greater than the average intensity of the data pulses.

3. A quantum communication system according to claim 1, further comprising an encoder configured to encode quantum information onto said pulses and wherein both said data pulses and said reference pulses pass through said encoder.

4. A quantum communication system according to claim 3, wherein the encoder is configured to encode the reference pulses.

5. A quantum communication system according to claim 1, wherein the sending unit is configured to produce reference pulses which have at least two intensity levels and the intensities of the reference pulses are varied in a predetermined sequence.

6. A quantum communication system according to claim 1, wherein the sending unit is configured to produce data pulses which have at least two intensity levels and the intensities of the data pulses are varied in a predetermined sequence.

7. A quantum communication system according to claim 1, wherein the photon source assembly comprises a laser diode and an intensity modulator.

8. A quantum communication system according to claim 1, wherein the photon source assembly comprises a laser diode driven by current pulses of different strengths.

9. A quantum communication system according to claim 1, wherein the photon source assembly comprises a quantum light source configured to emit pulses with a predetermined average photon number.

10. A quantum communication system according to claim 1, wherein the photon source assembly comprises a quantum and a classical light source and means for multiplexing pulses from the quantum and classical light source.

11. A quantum communication system according to claim 1, wherein the data and reference pulses are detected by common detectors within the receiving unit.

12. A method of quantum communication said method comprising:
from a sending unit, outputting photon pulses with each pulse having one of at least two different intensities and storing information for determining which pulses should be reference pulses and which pulses should be data pulses, the average intensity of the reference pulses being different to the average intensity of the data pulses said references pulses being multiplexed in time with said data pulses, wherein the number of reference pulses per unit time differs from the number of signal pulses per unit time; and
in a receiving unit, receiving pulses from the sending unit and determining which of the received pulses are data pulses and which are reference pulses from stored information in the receiving unit and determining the calibration of the quantum communication system by measuring the received data pulses, wherein the sending unit and the receiving unit share information for determining the position in the stream of pulses of light of the reference pulses and the data pulses before the stream of pulses of light is output by the sending unit.

13. A method according to claim 12, wherein the reference pulses have higher average intensity than the data pulses.

14. A method according to claim 13, wherein the pulses are output in a periodic sequence and the output times of the data and reference pulses are determined by information pre-shared by the sending unit and receiving unit.

15. A method according to claim 13, wherein the positions of the reference pulses within the sequence of pulses is determined by a random number shared or generated by the sending unit and receiving unit.

16. A method according to claim 12, the reference pulses have at least two intensity levels and the intensities of the reference pulses are varied in a predetermined sequence.

17. A method according to claim 16 further comprising comparing the measurements of pulses with different intensities.

18. A method according to claim 12, the data pulses have at least two intensity levels and the intensities of the data pulses are varied in a predetermined sequence.

19. A method according to claim 12, comprising:
encoding the reference pulses using an encoder in the sending unit which encodes the reference pulses with a modulation; and
decoding the modulated reference pulses in the receiving unit.

* * * * *